Oct. 14, 1930.  F. R. BERGSTEN  1,778,622
FERTILIZER DISTRIBUTOR FOR CULTIVATORS
Filed May 27, 1929  2 Sheets-Sheet 1

Inventor
Frank Robert Bergsten
By his Attorneys
Williamson Raiph Williamson

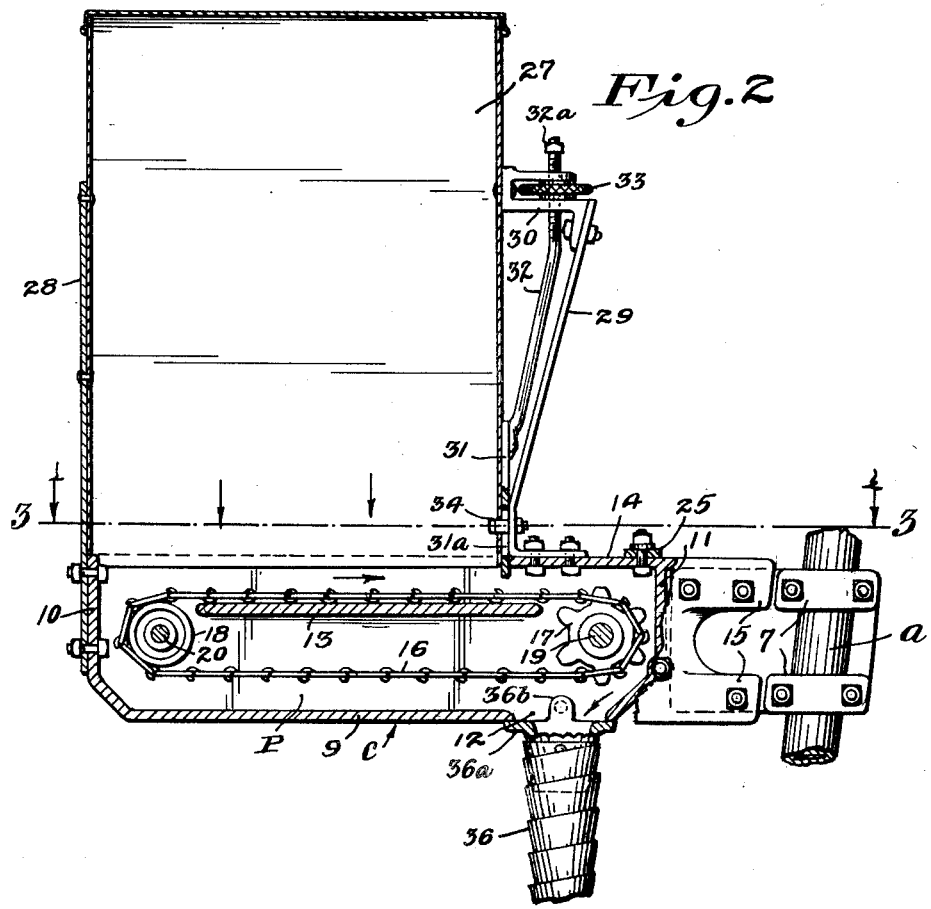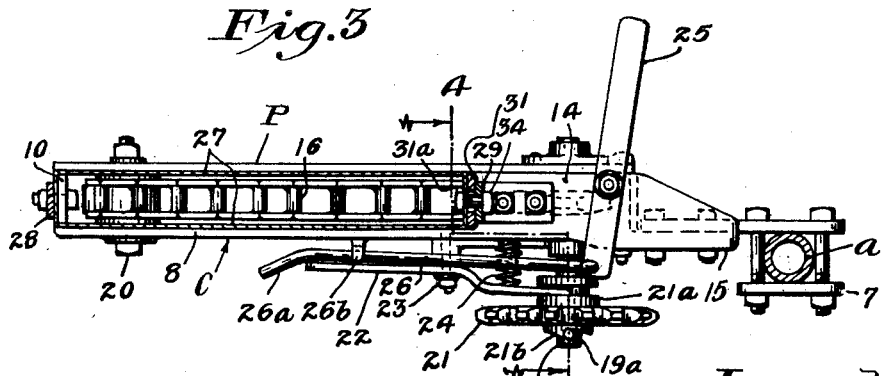

Patented Oct. 14, 1930

1,778,622

UNITED STATES PATENT OFFICE

FRANK ROBERT BERGSTEN, OF ANOKA, MINNESOTA

FERTILIZER DISTRIBUTOR FOR CULTIVATORS

Application filed May 27, 1929. Serial No. 366,271.

This invention relates to fertilizer distributors and especially to such distributors which are adapted for use in connection with agricultural implements such as cultivators.

It is an object of my invention to provide an improved and efficient fertilizer distributor for cultivators and other agricultural implements adapted to be easily installed as an attachment on different standard implements now in use, and capable of dispensing fertilizer uniformly under the control of the operator.

A further object is to provide an improved fertilizer distributor especially adapted for cultivators wherein the amount of material distributed may be accurately and finely regulated and wherein the working parts of the device are quickly accessible for cleaning or repair.

Another object is to provide a fertilizer distributor for cultivators wherein the working parts are compactly housed within a relatively small casing attached to the upwardly extending portions of a cultivator axle and having the supply hopper supported from said casing, provision being made for throwing the device in or out of driving connection with one of the wheels of the cultivator.

These and other objects and advantages of the invention will be apparent from the following description made in connection with the accompanying drawings wherein like reference characters refer to similar parts throughout the several views and in which, Fig. 1 is a perspective view of a well known type of cultivator having a pair of my fertilizer distributors operatively attached thereto for distributing material just rearwardly of the lead shovels of the cultivator;

Fig. 2 is a longitudinal section through one of my devices;

Fig. 3 is a cross section taken on the line 3—3 of Fig. 2, showing the structure of the conveying chain and the throw out or clutch mechanism.

Figure 1:
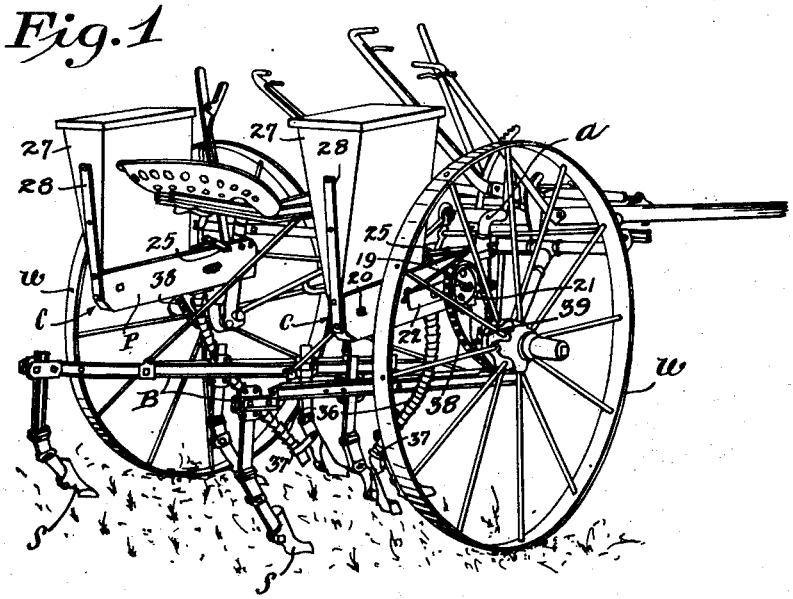
Figure 4:
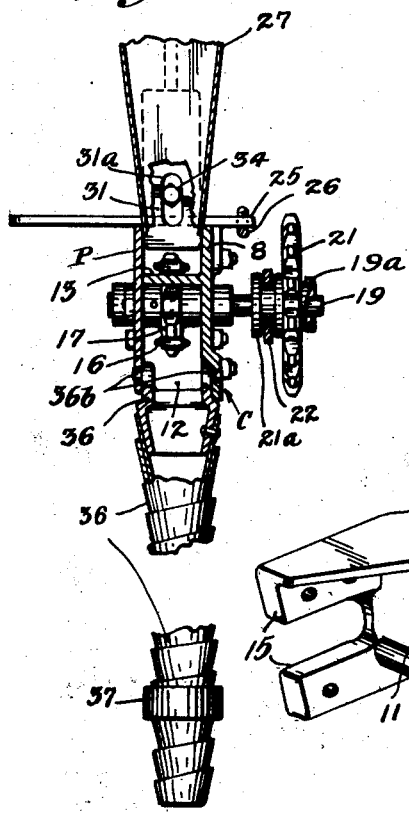
Fig. 4 is a cross section taken on the line 4—4 of Fig. 3, showing the means for driving the distributing conveyor, the feed regulating gate and the connection of the discharge spout with the casing.
Figure 6:
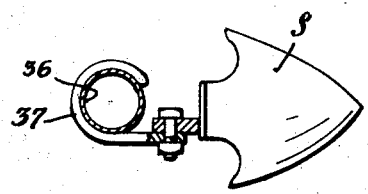
Fig. 6 is a cross section taken through a shank of one of the cultivator shovels showing the means for operatively holding the lower end of the flexible discharge spout in working position behind the shovel.
Figure 5:
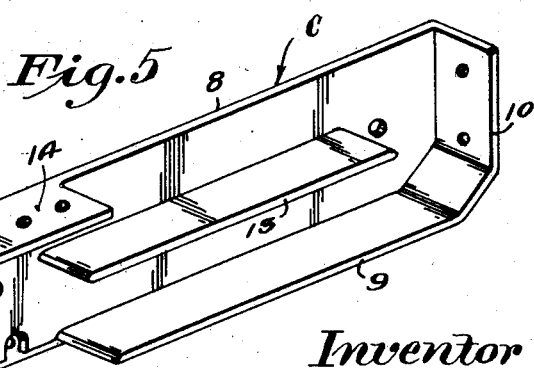
Fig. 5 is a perspective view of a casting or member comprising a substantial portion of the distributing casing.

In Fig. 1, a pair of my devices, right and left, are shown operatively attached to a cultivator of well known make. The cultivator is provided with the usual stationary axle A having the horizontally extending extremities on which the wheels W are rotatably mounted and having the usual upwardly extending portions $a$ and the main or central portion connecting the upwardly extending portions $a$. Said cultivator is provided with the usual cultivator beams B to which the depending shanks of the cultivator shovel S are rigidly secured.

My improved fertilizer distributors are usually attached in pairs occasioning the necessity of right and left devices, one being attached at each side of the cultivator. Since right and left devices are constructed similarly, for the purpose of brevity, only the right hand device will be described in detail.

My improved distributor comprises an elongated rectangular shaped casing which is rigidly attached at its forward end to one of the vertical or upstanding portions $a$ of the stationary cultivator axle, suitable clamping devices 7 being provided preferably clamping the stationary axle at widely spaced points to secure rigidity of attachment.

My said casing preferably comprises a generally rectangular shell or casting designated as an entirety by the letter C, having a vertical wall 8, bottom flange 9, vertical flange 10 defining the rear end of the casing connected with said bottom flange, and a vertical flange 11 defining the forward end of said casing and a short delivery flange 11$^a$ connected with flange 11, being spaced from the forward edge of flange 9 to afford a discharge opening 12. Casting C is further provided with a horizontal shelf 13 extending longitudinally of the vertical wall 8 and terminating some distance from the end flanges 10 and 11, said shelf being disposed a short distance below the upper edge of the wall 8. A top flange 14 extends above the forward end of shelf 13 and above the discharge passage 12, said flange being connected with the forward end flange 11 of the casting. In the forward extremities of casting C a pair of longitudinally extending attachment tongues 15 are provided to which the clamping devices 7 may be rigidly attached by bolts or other suitable means.

Flanges 9, 10 and 11 and 14 which co-operate with the wall 8 to form the shell or casting C are of similar width, and a rectangular plate P is provided and detachably secured against the edges of said flanges co-operating with casting C to form the distributing casing. Within said casing an endless chain conveyor 16 is operatively mounted, the upper run of which passes over shelf 13, and the lower run of which is spaced a short distance above the bottom flange 9 of the casing. Chain conveyor 16 is trained about a driving sprocket 17 at its forward end and an idler pulley or roller 18, at its rear end. Sprocket 17 is fixed to a driving shaft 19 which extends through casing C and plate P journaled in suitable bearings provided therein, one end of said shaft projecting considerably beyond the wall 8 of casing C and having a clutch pin 19ᵃ adjacent the outer extremity thereof. Idler roller 18 is loosely mounted on the medial portion of a bolt 20 which passes transversely through casing C and plate 12 and which detachably assists in securing said plate and casting together.

On the projecting end of shaft 19 a sprocket 21 is loosely mounted, provided with a shipper collar 21ᵃ which is engaged with a shipper lever 22 fulcrumed on the head of a bolt 23 which projects laterally and externally from the wall 8 of casting C. The working end of shipper lever 22 is yieldingly urged to outward position by a suitable coiled spring 24 interposed between said working end and a suitable stud on the external surface of wall 8, causing clutch teeth 21ᵇ on the outer face of sprocket 21 to be engaged with the clutch pin 19ᵃ on driving shaft 19. An operating lever 25 is fulcrumed on a vertical pivot above flange 14 extending transversely above the casing. One end of said lever is pivotally connected with the forward end of a camming bar 26 which extends longitudinally of casting C and between said casting and the rear arm of shipper lever 22 and is confined by a keeper 26ᵇ. Camming bar 26 has an offset rear camming end 26ᵃ which when moved forwardly by lever 25 cams the rear end of shipper lever 22 outwardly disconnecting the driving engagement between the pinion 21 and driving shaft 19.

A fertilizer hopper 27 is secured to the top of my distributing casing and is open at its lower end to communicate with said casing through the top opening in casting C between the rear edge of flange 14 and the upper edge of flange 10. Hopper 27 may be rigidly secured to casting C of the casing in any suitable manner, and as shown, I provide a rigid vertical strip 28 connecting the rear wall of hopper 27 with the rear flange 10 of casting C, and an inclined bracket 29 having an out-turned base securing the forward wall of hopper 27 to the top flange 14 of casting C.

The upper end of bracket 29 has rigidly attached thereto a U-shaped confining member, the base portion of the U being attached to hopper 27. Between the base portion of bracket 29 and the adjacent wall of hopper 27 a vertically slidable regulating gate is mounted projecting downwardly into the distributing casing at a point above the forward end of the horizontal shelf 13. Regulating gate 31 is rigidly connected with an upwardly extending shank 32 having an upper vertical portion which is threaded and which passes through the opposite sides of confining member 30. A small adjustment wheel 33 threadedly engages shank 32 and is confined by member 30. The downward movement of gate 31 is limited by means of a stop member 32ᵃ secured to the upper end of shank 32. A guide pin or bolt 34 engages the slotted portion 31ᵃ of gate 31, preventing lateral displacement of said gate when the same is adjusted. It will be seen that the gate 31 is projected between the lip of the top flange 14 of casting C and the forward wall of the hopper, being adjustable above the shelf 13 and the chain conveyor to control the amount of material conveyed by the chain.

The opposing edges of bottom flanges 9 and 11ᵃ define a discharge passage at the forward end of my distributing casing and to this discharge passage I detachably connect a flexible discharge spout 36 having a rigid upper section 36ᵃ provided with outwardly projecting pins or trunnions 36ᵇ which interlock with apertured portions oppositely disposed in wall 8 of casting C and in plate P. The lower end of discharge spout 36 as shown is secured rearwardly of one of the cultivator shovels by suitable means, such as a hook 37 bolted to the shank of shovel S. A driving chain 38 connects sprocket 21 with a suitable driving sprocket 39 rigidly attached to the inner face of one of the cultivator wheels.

Operation

The operation of my improved device may be briefly described as follows:—

The hoppers 27 are first filled with suitable fertilizer material and the regulating gates 31 are adjusted as desired by manipulating the knurled wheels 33. With sprocket 21 driveably connected with shaft 19, chain conveyor 16 will be driven over the shelf 13 in the direction indicated by the arrow in Fig. 2. The chain for my endless conveyor is preferably of the open link construction, in order that material may pass through the chain onto the shelf and be drawn across the shelf and delivered at the forward end thereof, some of the material falling through the chain and some passing around the driving sprocket 17 and falling into the discharge spout. By the manipulation of the adjustment wheel 33 a micrometer adjustment of the control gate 31 is effected. Material will be evenly and steadily fed as the cultivator is pulled across the ground. If it is desired to shut off the distribution of fertilizer it is only necessary to pull the lever 25 rearwardly disconnecting sprocket 21 with the driving shaft 19.

Any material which adheres to the chain or drops through the upper run of the chain and does not fall into the discharge passage will not be wasted but will be collected within the distributing casing since the entire endless conveyor and all working parts are wholly enclosed. Such material will tend to work its way back above shelf 13 and be delivered or dropped into the discharge spout. The device is self-cleaning since the driving sprocket 17 penetrates the links thereby ejecting material at a point directly above the discharge spout. This is of great importance in a device for distributing fertilizer.

To clean or repair the working parts of my device it is only necessary to remove plate P from casting C by releasing a few bolts, whereby the working parts will all be readily accessible and the chain conveyor may be quickly detached and slipped off of idler roller 18 and removed from driving sprocket 17. Discharge spout 36 may also be removed easily after plate P has been detached, by disengaging trunnions 36ª from casting C and plate P.

From the foregoing description it will be seen that I have invented an extremely simple but highly efficient fertilizer distributor for cultivators and other agricultural implements comprising few parts and capable of being manufactured at relatively low cost. The entire device is supported by clamping connection between the forward end of my casting C with the upwardly extending portions of the stationary cultivator axle.

With my device a uniform distribution of fertilizing material is assured and the material will be distributed at a desired point (as shown, directly behind the forward cultivator shovel). In most fertilizing devices now known, the material cannot be evenly distributed and is furthermore widely scattered.

It will, of course, be understood that various changes may be made in the form, details, arrangement and proportions of the parts without departing from the scope of applicant's invention.

What is claimed is:

1. A fertilizer distributor having in combination, a supply hopper, a rectangular box-like casing comprising an integral shell section and a plate detachably connected therewith, to enclose the same, said hopper having communication with the top of said shell section, a horizontal shelf integrally formed with and medially disposed within said shell section and terminating short of the ends of said shell section, a pair of conveyor supporting members within said casing journaled in said shell member and in said plate, an endless conveyor trained about said supporting members and having a horizontal run passing over said shelf, and a discharge passage in the bottom of said casing.

2. A fertilizer distributor having in combination, a hopper, a casing comprising a substantially rectangular casting, and a plate detachably secured thereto, said casting having a top, bottom, and end walls, and a vertical side wall, said plate enclosing said casting, a horizontal shelf integrally formed with said casting and extending parallel to said top and bottom walls and terminating short of said end walls, a pair of rotary conveyor supporting members mounted within said casing between the extremities of said shelf and the end walls of said casting and journaled in the side wall of said casting and in said plate, an endless conveyor wholly within said casing and trained about said supporting members said conveyor having an upper run passing over said shelf and a lower run spaced from the bottom wall of said casting, and a discharge passage through the bottom wall of said casting and disposed adjacent one end of said casting, said hopper having communication with the top of said casting.

3. A fertilizer distributor for cultivators and the like, comprising a casing, a supply hopper communicating with the top of said casing, a driving shaft journaled in said casing and extending transversely thereof, said shaft projecting from one side of said casing, a sprocket loosely mounted on the projecting end of said driving shaft and having slidable clutch engagement with a clutch element on said shaft, means for connecting said sprocket for driving with one of the wheels of the cultivator or analogous implements, means for yieldingly holding said sprocket in driving engagement with said clutch element, a shipper lever connected with said sprocket, a control lever pivoted to the top of said casing and a camming member engageable with said shipper lever and connected with said control lever to release driving engagement of said sprocket, a conveyor driving member fixed to said driving shaft within said casing, an idler member journaled within said casing, an endless conveyor trained over said conveyor driving member and said idler member and having its upper run disposed below the top of said casing, and a discharge passage in the bottom of said casing.

4. A fertilizer distributor comprising an elongated horizontal casing having spaced vertical sides and ends provided with inwardly inclined lower portions, a supply hopper above said casing communicating with the top thereof through an elongated entrance, a horizontal shelf disposed medially within said casing extending longitudinally thereof below said entrance, said shelf being spaced from the ends of said casing, a pair of rotary conveyor-supporting members mounted within said casing between the respective ends of said shelf and the ends of said casing, an endless conveyor trained about said supporting members with its upper run passing over said shelf, the lower run of said conveyor being spaced from the bottom of said casing to return material to the top of said shelf, a discharge passage in the bottom of said casing adjacent the inclined portion of one of the ends thereof and below one of said conveyor-supporting members.

5. A fertilizer distributor for cultivators or the like comprising a casing, a supply hopper communicating with the top of said casing, a driving shaft journaled in said casing extending transversely thereof, said shaft projecting from one side of said casing, a sprocket loosely mounted on the projecting end of said driving shaft and having clutch engagement with a clutch element on said shaft, means for connecting said sprocket for driving with one of the wheels of the cultivator, means for yieldingly holding said sprocket in driving engagement with said clutch element and means including a shipper lever for camming said sprocket out of clutch engagement with said shaft, a conveyor driving member fixed to said driving shaft within said casing, an idler member journaled within said casing, an endless conveyor trained over said driving member and said idler member and having its upper run disposed below the top of said casing and a discharge passage in the bottom of said casing.

In testimony whereof I affix my signature.

FRANK ROBERT BERGSTEN.